March 20, 1951  T. GRAY  2,545,922
PULSED ECHO SOUNDER AND LIKE SUBAQUEOUS
DISTANCE MEASURING APPARATUS
Filed Jan. 26, 1948
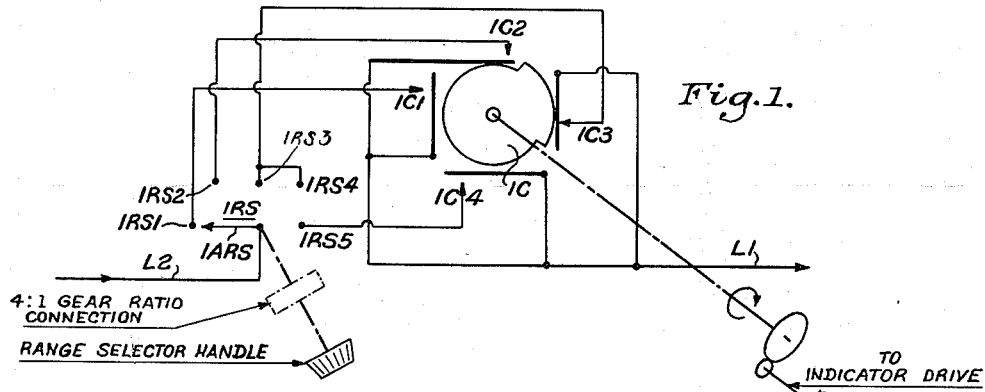
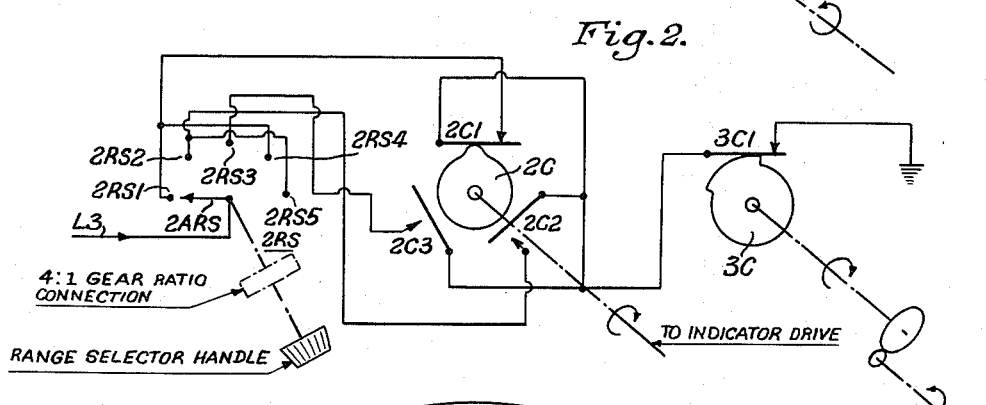
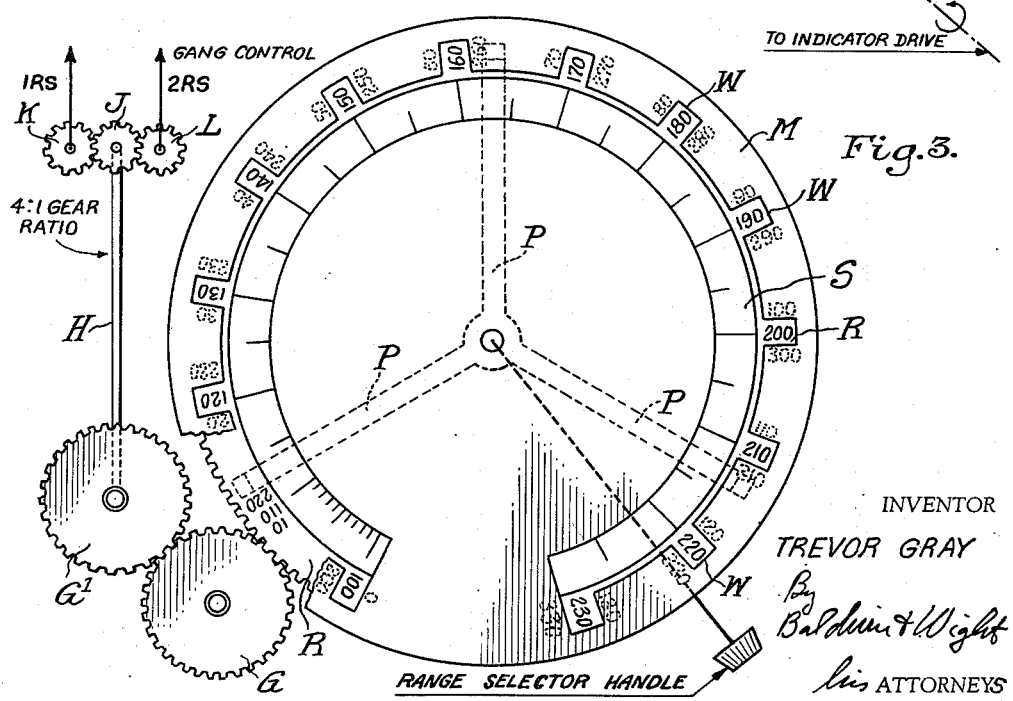
INVENTOR
TREVOR GRAY
By Baldwin & Wight
his ATTORNEYS Patented Mar. 20, 1951

2,545,922

UNITED STATES PATENT OFFICE 2,545,922

PULSED ECHO SOUNDER AND LIKE SUB-AQUEOUS DISTANCE MEASURING APPARATUS

Trevor Gray, Crossways, Shenfield, England, assignor to Marconi Sounding Device Company Limited, London, England, a company of Great Britain Application January 26, 1948, Serial No. 4,426
In Great Britain February 20, 1947

8 Claims. (Cl. 177—386)

This invention relates to pulsed echo sounders and like sub-aqueous distance measuring apparatus and more particularly to pulsed echo sounders and the like of the kind in which a pulse is periodically transmitted and the received echo employed to actuate an echo signal indicator which is rotated at known constant speed a plurality of times per pulse period. The advantage of rotating the echo signal indicator a plurality of times per pulse period as distinct from rotating it only once per pulse period is, of course, that the depth or distance scale, which is a direct function of the angular movement of the indicator between transmission and echo reception, is made correspondingly longer.

The object of the present invention is to provide an improved echo sounder or the like of the kind referred to which shall have an effectively very long scale with good depth or distance discrimination; which shall have a substantially uniform and evenly divided scale able to be embodied in a relatively small size; which shall be simple to use and free from ambiguities of reading; and which shall have a very high degree of immunity from unwanted interference due to noise and other causes.

According to this invention an echo sounder or the like of the kind referred to comprises a pulse transmitter; a pulse receiver; an echo signal indicator which is rotated a plurality of times per pulse period; a scale member associated with the rotational path of the indicator; a plurality of series of selectable indicia which can be selectably associated with said scale member; selectably operable switching means for preventing operation of the echo signal indicator except during a selectable predetermined revolution in each pulse period; and range selector means for effecting co-related selection of the indicia and of the revolution in which the indicator is operative so that in each position of adjustment of the range selector the selected indicia indicate depths or distances appropriate to the revolution selected.

Preferably the indicator controlling switching means include selectable phasing switches successively operated by means driven at a speed co-related to the speed of rotation of the indicator and the transmitter also includes switching means comprising selectable phasing switches and a so-called permissive switch also driven at speeds co-related to the speed of rotation of the indicator whereby the relative times of pulse transmission and commencement of selected revolutions are made such that successive selected revolutions correspond to successive overlapping ranges of depth or distance.

Preferably the rotating echo indicator is a neon or other gas filled discharge tube which is mechanically rotated at a predetermined speed.

The invention as illustrated in the accompanying drawings which show one embodiment of the invention as applied to an echo sounder adapted to indicate depths up to a maximum of 530 fathoms will now be described. It will be understood that the invention is by no means limited to this particular example nor to the particular numerical values given therein. In the drawings Figs. 1 and 2 show diagrammatically preferred switching arrangements incorporated in the embodiment and Fig. 3 shows a preferred indicator scale arrangement partially broken away to show the associated mask, scale member and indicia ring member.

In the embodiment illustrated the echo signal indicator is a neon or other gas discharge tube (not shown) actuated by received echo signals in the usual way and driven at four times the pulse repetition frequency, i. e. so that one revolution takes a quarter of a pulse period, the speed of rotation being also such that the go and return time for an echo in 150 fathoms is equal to the time taken by one revolution. Five depth ranges are covered as follows: first range of 0–130 fathoms, during which the indicator tube moves through $13/15$ of its circular path the arc of scale corresponding to the remaining 20 fathoms being left blank; a second range of 100–230 fathoms again covering $13/15$ of a revolution and overlapping the first range by 30 fathoms; a third range of 200–330 fathoms; a fourth range of 300–430 fathoms; and a final range of 400–530 fathoms. Each range thus corresponds to the same $13/15$ of a revolution with a 20 fathom blank space and overlapping the range below by 30 fathoms. The effective part of the scale is only $13/15$ of a revolution in order to allow contacts to change over while the indicator is behind the blank part of the scale. There is provided a range selector handle gang controlling switching means associated with the indicator (either directly or via a receiving circuit preceding the indicator), switching means associated with the transmitter, and an indicia ring associated with the indicator scale. Fig. 1 shows the switching means associated with the neon tube indicator. Referring to this figure the said indicator switching means include a cam IC which is rotated at a quarter the speed of the indicator and is arranged to close in turn, for 90° of rotation, each of four receiver phasing switches IC1, IC2, IC3, IC4 arranged at 90° round the cam. These phasing switches are all connected together on one side through lead L1 to one terminal of the indicator (not shown) and on the other side each is connected to a five contact range selector switch IRS of which the third and fourth IRS3 and IRS4 contacts are electrically common. The first phasing switch 1C1 is connected to the first contact 1RS1, the second 1C2 to the second contact 1RS2, the third 1C3 to the common third and fourth contacts 1RS3, 1RS4 and the fourth 1C4 to the fifth contact 1RS5. The movable arm 1ARS of the range selector switch is driven by the range selector handle (not separately shown) and is connected by lead L2 to the output of the echo signal receiver amplifier (not shown).

Referring to Fig. 2 the range selector handle also operates a second five contact range selector switch 2RS associated with a phasing switch arrangement and a so-called permissive switch arrangement in a suitable circuit of the transmitter. This phasing switching arrangement comprises a cam 2C rotating at the same speed as the indicator and adapted to close momentarily to close in turn three transmitter phasing switches 2C1, 2C2, 2C3, arranged at 120° round it. The permissive switch comprises a switch contact 3C1 closed by a further cam 3C rotating at a quarter the indicator speed said switch being closed by said cam for substantially 90° in each rotation. The connections are as follows: If the transmitter (not shown) is of the customary type in which an earth connection is put on to transmit a pulse, the earthing lead L3 is taken to the brush arm 2ARS of the transmitter range selector switch of which the first and fourth contacts 2RS1, 2RS4 and the second and fifth contacts 2RS2, 2RS5 are connected together. The first and fourth contacts 2RS1, 2RS4 are connected to one terminal of the transmitter phasing switch 2C1; the second and fifth contacts 2RS2, 2RS5 are connected to one terminal of the transmitting phasing switch 2C2; and the third contact 2RS3 is connected to one terminal of the transmitter phasing switch 2C3. The remaining terminals of the three transmitter phasing switches are connected together and through the contacts 3C1 of the permissive keying switch to earth. It will be seen, therefore, that a pulse is only transmitted when one of the transmitter phasing switches and the appropriate permissive keying contacts are closed simultaneously. Of the transmitter keying contacts 2C1, 2C2 and 2C3 only one contact is in use for any given setting of the range switch. To provide transmission at only every 4th operation of the key switch contact 3C1, the rotating mechanism is proportioned so cam 3C is operating at ¼ the speed of cam 2C. 1C1, 1C2, 1C3, and 1C4 are used to make the circuit to the indicator only during that revolution of the indicator which corresponds to the range in use. Contact interconnection is merely a matter of convenience. The following contacts are in use on the various ranges:

|  | Indicator | Transmitter |
|---|---|---|
| Range 1, 0–130 | 1C1 | 2C1 |
| Range 2, 100–230 | 1C2 | 2C2 |
| Range 3, 200–330 | 1C3 | 2C3 |
| Range 4, 300–430 | 1C3 | 2C1 |
| Range 5, 400–530 | 1C4 | 2C2 |

The apparatus of my invention is a constant speed apparatus using a phased system of transmission. In the apparatus described the effective scale range is 530 fathoms but on any given setting of the range switch only one section of 130 fathoms is in use.

The range selector handle operates, as stated, not only the receiver and transmitter range selector switches 1RS and 2RS but also drives a movable indicia ring member R through the spider connection P shown in dotted lines adjacent the scale S against which the indicator lamp rotates. The indicia ring member R is provided with gear teeth on its peripheral edge which engage the gear train G and $G^1$ which drives the shaft H terminating in gear J that meshes with gears K and L connected through the shafts that operate the switches 1RS and 2RS. The scale S which is shown in Fig. 3 may conveniently be a transparent or translucent circular scale S with the lamp (not shown) rotating underneath it. The indicia ring R encircles the scale S and is positioned under a mask M fitted with windows W in fixed predetermined relation to the scale S and so arranged that in each of the five positions of which the ring is capable of being set one of five sets of indicating figures carried by the ring member appears in the windows. In the first range the figures appearing in the windows are appropriate to the range 0 to 130 fathoms and there may be, for example, fourteen such windows so that figures corresponding to soundings at 10 fathom intervals appear against the scale. Similarly in the second range the position of and indicia on the ring are such that the figures 100 to 230 appear in the windows. In the third range the figures 200 to 330 appear . . . and so on. The scale does not change with successive revolutions of the indicator but only when the range selector is operated. Overlap between successive ranges is provided so that if the depth is varying, e. g., increasing, it can, when near the top of one range, be picked up on the next range by operating the range selector.

It will be appreciated that with the above embodiment when the range selector handle is moved into position for the first range, the arm 1ARS of the indicator range selector switch 1RS is on its first contact 1RS1 and the switch 1C1 will switch in the indicator immediately after transmission of a pulse and hold it switched in for 90° of rotation of the operating cam 1C, that is to say, for one revolution of the indicator lamp. At the same time the arm 2ARS of the transmitter range selector switch 2RS is also on its first contact 2RS1 so that the first transmitter phasing switch 2C1 will close, in series with the closed switch contact 3C1 of the permissive keying switch, when the indicator lamp is at zero on the scale, so that, at this instant, a pulse is transmitted. The indicia now associated with the scale are appropriate to the 0–130 fathom range. If an echo is received during the first revolution of the lamp the lamp will flash and the depth can be read off directly. When the range selector handle is moved to its second position both range selector switch arms 1ARS and 2ARS are moved to the second contacts 1RS2 and 2RS2 and accordingly the receiver phasing switch 1C2 will close two-thirds of a revolution of the lamp after transmission of a pulse the moment of transmission of which is now determined by the second transmitter phasing switch 2C2 . . . and so on. Thus there is effective co-operating transmitter and receiver phasing switch control such that for the first range the lamp moves through an operative revolution immediately following a transmission pulse; for the next range it moves through an operative revolution following a transmission pulse after a delay of two-thirds of a revolution; for the next range it moves through an operative revolution following a transmission pulse after a delay of four-thirds of a revolution . . . and so on.

It will be seen that the invention satisfies all the operating requirements mentioned hereinbefore, giving effectively a very long scale with good discrimination. Readings are free from any ambiguity and interference due to noise or other causes occurring during non-operating revolutions of the lamp is avoided.

What I claim is:

1. In a sub-aqueous distance measuring device of the kind in which a pulse is periodically transmitted and the received echo, if any, employed to actuate an echo signal indicator which is rotated at known constant speed a plurality of revolutions per pulse period, a pulse transmitter, a pulse receiver, an echo signal indicator, means for rotating said indicator a plurality of revolutions per pulse period, an indicia ring member associated with the rotational path of said indicator, said indicia ring member having a plurality of sets of markings of which each set is appropriate to a different depth range, successive markings of each set being spaced with markings of the other sets between them, a masking member over said indicia ring member, means for producing any of a plurality of predetermined relative positions between said indicia ring member and said masking member in each of which positions a different set of markings on said indicia ring member is exposed, selectably operable switching means for preventing operation of the echo signal indicator except during a selectable predetermined revolution in each pulse period, and a range selector means for selecting the revolutions in which the indicator is operative and determining the relative position of the indicia ring member to the masking member whereby in each position of adjustment of the range selector means the markings exposed are those of a depth range appropriate to the revolutions selected.

2. A sub-aqueous distance measuring device as set forth in claim 1, wherein said switching means include driven means which are driven at a speed coordinated with the speed of rotation of said indicator and selectable phasing switches successively operated by said driven means, and a permissive switch operated in timed-relation to the operation of said driven means and coordinated with the speed of rotation of the indicator whereby the relative times of pulse transmission and the commencement of selected revolutions of said driven means are made such that successive selected revolutions correspond to successive overlapping ranges of depth or distance.

3. A sub-aqueous distance measuring device as set forth in claim 1 wherein the echo signal indicator is revolved around said indicia ring member, said masking member being disposed concentric with said indicia ring member, said masking member having cut-outs formed therein adapted to be selectively registered with the sets of markings on said indicia ring member.

4. A sub-aqueous distance measuring device as set forth in claim 1 in which said switching means include means driven at a speed coordinated with the speed of rotation of said indicator and selectable phasing switches successively operated by said driven means and wherein said transmitter includes selectable phasing switches and a permissive switch, means for driving the phasing switches and said permissive switch in predetermined relation to the speed of rotation of said indicator whereby the relative times of pulse transmission and commencement of selected revolutions are made such that successive selected revolutions correspond to successive overlapping ranges of depth or distance, a scale member adjacent said indicia ring member, said echo signal indicator being rotated around said scale member which is concentric with the indicia ring member, the latter carrying sets of indicia and adjustable with relation to a mask adapted to exhibit only one of said sets at a time and all said selectable phasing switches being gang controlled by adjustment means provided for securing relative annular adjustment of said mask and said ring.

5. In a sub-aqueous distance measuring device of the kind in which a pulse is periodically transmitted and the received echo, if any, employed to actuate an echo signal indicator which is rotated at known constant speed a plurality of revolutions per pulse period, a pulse transmitter, a pulse receiver, an echo signal indicator, mechanical means for rotating said indicator a plurality of revolutions per pulse period, an indicia ring member associated with the rotational path of said indicator, said indicia ring member having a plurality of sets of markings of which each set is appropriate to a different depth range, successive markings of each set being spaced with markings of the other sets between them, a masking member over said indicia ring member, means for producing any of a plurality of predetermined relative positions between said indicia ring member and said masking member in each of which positions a different set of markings on said indicia ring member is exposed, selectably operable switching means for preventing operation of the echo signal indicator except during a selectable predetermined revolution in each pulse period, a range selector means for selecting the revolutions in which the indicator is operative and determining the relative position of the indicia ring member to the masking member whereby in each position of adjustment of the range selector means the markings exposed are those of a depth range appropriate to the revolutions selected, and means whereby the relative times of pulse transmission and commencement of selected revolutions are made such that successive selected revolutions correspond to successive overlapping ranges of depth or distance.

6. A sub-aqueous distance measuring device as set forth in claim 5 in which the ring carrying sets of indicia is circumferentially adjustable with relation to said masking member whereby said masking member exhibits only one selected set of indicia at one time.

7. A sub-aqueous distance measuring device as set forth in claim 5 in which said selectably operable switching means are operated every 120° of revolution of said indicator.

8. In a sub-aqueous distance measuring device as set forth in claim 5, a permissive switch operated concurrently with the rotation of said indicator, said switch operating at one-fourth the speed of said indicator and continuing in its operating condition for at least 90° of rotation of said indicator.

TREVOR GRAY.

REFERENCES CITED

The following references are of record in the file of this patent:

UNITED STATES PATENTS

| Number | Name | Date |
| --- | --- | --- |
| 2,009,449 | Hedley | July 30, 1935 |
| 2,394,286 | Balisdell | Feb. 5, 1946 |
| 2,397,175 | White | Mar. 26, 1946 |